United States Patent
Aabye et al.

(10) Patent No.: US 11,325,807 B2
(45) Date of Patent: May 10, 2022

(54) LINE HANDLING DEVICE FOR LETTING OUT, WINDING UP, AND LOCKING A LINE

(71) Applicant: Wiral Technologies AS, Oslo (NO)

(72) Inventors: Øivind Aabye, Trondheim (NO); Eivind Sæter, Trondheim (NO)

(73) Assignee: Wiral Technologies AS, Oslo (NO)

( * ) Notice: Subject to any disclaimer, the term of this patent is extended or adjusted under 35 U.S.C. 154(b) by 125 days.

(21) Appl. No.: 16/641,577

(22) PCT Filed: Sep. 18, 2018

(86) PCT No.: PCT/NO2018/050232
§ 371 (c)(1),
(2) Date: Feb. 24, 2020

(87) PCT Pub. No.: WO2019/059778
PCT Pub. Date: Mar. 28, 2019

(65) Prior Publication Data
US 2021/0155444 A1 May 27, 2021

(30) Foreign Application Priority Data
Sep. 19, 2017 (NO) .................................. 20171502

(51) Int. Cl.
*B65H 59/02* (2006.01)
*B65H 75/40* (2006.01)
(Continued)

(52) U.S. Cl.
CPC ........... *B65H 59/02* (2013.01); *B65H 75/406* (2013.01); *B65H 75/4402* (2013.01);
(Continued)

(58) Field of Classification Search
CPC .............. B65H 75/406; B65H 75/4402; B65H 75/4428; B65H 2402/412; B65H 2402/414; B65H 2701/35; B65H 59/02
See application file for complete search history.

(56) References Cited

U.S. PATENT DOCUMENTS 1,047,113 A 12/1912 Olson
1,237,730 A 8/1917 Weber
(Continued)

FOREIGN PATENT DOCUMENTS

| CN | 200954391 | 10/2007 |
| CN | 205867588 | 1/2017 |
| GB | 2211172 | 6/1989 |

OTHER PUBLICATIONS

Ali Express, "New Grip Red Wheel Flying Kite Reel Kite Winder Ballbearing Handle Tools with 60m/110m String Line Kites Accessories" (https://www.aliexpress.com/item/New-Grip-Red-Wheel-Flying-Kite-Reel-Kite-Winder-Ballbearing-Handle-Tools-with-60m-110m-String/32714087818.html?spm=2114.search0302.4. 18.t1nYLn).
(Continued)

*Primary Examiner* — Sang K Kim
(74) *Attorney, Agent, or Firm* — Andrus Intellectual Property Law, LLP (57) ABSTRACT

A line-handling device is for letting out, winding up and locking a line. The line-handling device has: a first handle; a substantially flat reel which is rotatable relative to the first handle; a line-guiding part which is fixed relative to the first handle; a locking mechanism for locking the reel in a non-rotatable position; and an attachment element for a tautening device, the reel being displaceable relative to the first handle parallel to the rotational axis of the reel. A line-handling system is for suspending a line between two (Continued)

anchoring points and a method is for suspending a line between two anchoring points.

10 Claims, 11 Drawing Sheets

(51) Int. Cl.
*B65H 75/44* (2006.01)
*F16G 11/12* (2006.01)

(52) U.S. Cl.
CPC ... *B65H 75/4428* (2013.01); *B65H 2402/412* (2013.01); *B65H 2402/414* (2013.01); *B65H 2701/35* (2013.01); *F16G 11/12* (2013.01)

(56) References Cited

U.S. PATENT DOCUMENTS

| | | | |
|---|---|---|---|
| 1,783,159 A | * | 11/1930 | Palmer ............... B65H 75/406 242/395 |
| 1,784,064 A | | 12/1930 | Griswold |
| 1,823,165 A | | 9/1931 | Proctor |
| 1,826,481 A | | 10/1931 | Harry |
| 1,982,042 A | | 11/1934 | Henry |
| 2,172,907 A | | 9/1939 | Humphrey |
| 2,249,433 A | | 7/1941 | Palmer |
| 2,505,151 A | | 4/1950 | Schweitz |
| 2,582,289 A | | 1/1952 | Smith |
| 2,587,432 A | | 2/1952 | Bellah |
| 2,628,041 A | | 2/1953 | Slater |
| 3,044,732 A | | 7/1962 | Simonds |
| 3,171,227 A | | 3/1965 | Merrill |
| 4,497,457 A | | 2/1985 | Harvey |
| 4,577,809 A | | 3/1986 | Auer |
| 6,302,347 B1 | | 10/2001 | Amirault |
| 2011/0101146 A1 | | 5/2011 | Bordignon |
| 2011/0174912 A1 | | 7/2011 | Aharoni |
| 2013/0092781 A1 | | 4/2013 | Gregory et al. |

OTHER PUBLICATIONS

Norwegian Search Report for NO 20171502, dated Apr. 19, 2018.
International Search Report and the Written Opinion for PCT/NO2018/050232, dated Nov. 16, 2018.

* cited by examiner

LINE HANDLING DEVICE FOR LETTING OUT, WINDING UP, AND LOCKING A LINE

CROSS-REFERENCE TO RELATED APPLICATIONS

This application is the U.S. national stage application of International Application PCT/NO2018/050232, filed Sep. 18, 2018, which international application was published on Mar. 28, 2019, as International Publication WO 2019/059778 in the English language. The International Application claims priority of Norwegian Patent Application No. 20171502, filed Sep. 19, 2017. The international application and Norwegian application are both incorporated herein by reference, in entirety.

FIELD

The invention relates to a line-handling device for letting out, winding up and locking a line, and a line-handling system for suspending a line between two anchoring points. The invention also relates to a method for suspending a line between two anchoring points.

BACKGROUND

In recent years, there has been a development of cable-camera systems, which are based on a motor driving a camera back and forth along a suspended line. The motor may, for example, be controlled by a user via a remote control. To be able to quickly suspend and take down a cable-camera system, efficient line-handling is necessary. A drawback of some known line-handling system is that they are relatively large and quite difficult to carry.

A problem with prior-art line-handling devices is that they often use complex ways of locking the line so that the structures of line-handling devices must consist of many parts. This makes handling and transport difficult and the suspending of the line between two anchoring points take a long time. Besides, the designs and the geometries of the components in prior-art line-handling devices result in the production of such devices being costly.

An example of a commercially available line-handling device with a round reel and a line guide is Ali Express, "New Grip Red Wheel Flying Kite Reel Kite Winder Ballbearing Handle Tools with 60 m/110 m String Line Kites Accessories" (https://www.aliexpress.com/item/New-Grip-Red-Wheel-Flying-Kite-Reel-Kite-Winder-Ballbearing-Handle-Tools-with-60m-110m-String/32714087818.html?spm=2114.search0302.4.18.t1nYLn). However, the device has no way of locking the reel, so that no more line is paid out, and then allow the reel to be reopened, which is necessary for a line to be suspended. Neither is there any attachment element for the line to be suspended by the reel. It is not possible to suspend a line by exclusively using this device, and the device will therefore be time-consuming in use. The round reel also makes the device not very compact. The same device is also described in patent document CN 200954391 Y.

Further, U.S. Pat. No. 2,249,433 A shows a line-handling device with a locking function, line guide and flat reel that takes up little space. However, the locking mechanism comprises a round sheave with the flat side thereof perpendicular to the flat side of the reel, whereby the line-handling device as a whole does not appear flat. Besides, the device is not designed for being suspended as the lock in itself is not strong enough for this, and there is not a suitable attachment element for a tautening strap either.

U.S. Pat. No. 1,823,165 A discloses a line-handling device consisting of a flat reel and a handle. The device has no line guide that can guide the line onto the reel. Neither has it any way of attaching a tautening strap so that it can be tautened. It is therefore not possible to use this line-handling device alone to suspend a line.

U.S. Pat. No. 2,172,907 discloses a reel and tautening system for a clothesline. The system has a round reel and a cranking system with a pawl that allows the line to be tautened with the crank when mounted. As the reel is round, it will take up much space when the system is in a packed-up state.

U.S. Pat. No. 2,582,289 shows a line-handling device with a flat reel and a line guide. The line-handling device also enables locking of the reel. The reel has been made to be attachable against a pole and cannot be attached to a tautening strap. This line-handling device is therefore not suitable for tautening a line.

CN 205867588 U shows a line-handling device with a round reel and a line guide. The reel does not enable the attachment of a tautening strap, and there is no way of locking the reel either.

US 2013/0092781 A1 shows a line-handling device with a flat reel, but without any lock or line guide. The device will therefore not be usable for tautening a line alone.

U.S. Pat. No. 1,826,481 A discloses a line-handling device with a flat reel and a line guide. The reel cannot be locked, and it is therefore not possible to suspend a line by using this device alone.

Further line-handling devices are disclosed in the documents U.S. Pat. Nos. 1,784,064 A, 1,237,730 A, 2,587,432 A, 4,497,457 A, 1,982,042 A, and 6,302,347 B1.

SUMMARY

The invention has for its object to remedy or reduce at least one of the drawbacks of the prior art or at least provide a useful alternative to the prior art. The object is achieved through the features that are specified in the description below and in the claims that follow.

The invention is a new line-handling device which has not been used earlier. Many of the current solutions for line-handling contain single elements of the operation of the invention, but none has combined them together.

The invention is defined by the independent claims, and the dependent claims define advantageous embodiments of the invention.

In a first aspect, the invention relates more specifically to a line-handling device for letting out, winding up and locking a line, the line-handling device comprising:
  a first handle;
  a substantially flat reel which is rotatable relative to the first handle;
  a line-guiding part which is fixed relative to the first handle;
  a locking mechanism for locking the reel in a non-rotatable position; and
  an attachment element for a tautening device,
the reel being displaceable relative to the first handle parallel to the rotational axis of the reel.

A line may be wound onto a reel by the line being wrapped around the reel, often by the reel being rotated. To be able to wind a suitable amount of line per turn of the reel, the reel must have a certain extent in a direction perpendicular to the rotational axis of the reel. Therefore, a reel is often circular, hereinafter referred to as round, with a certain diameter to adapt the amount of line wound per turn. This form thereby gives a large, unused volume in the middle of the reel. The fact that the reel of the line-handling device is substantially flat, therefore gives a lower packing volume. The reel may have an extent in a direction perpendicular to the rotational axis for collecting a suitable amount of line per turn, hereinafter referred to as the longitudinal direction of the reel, whereas the reel may be substantially flat in the direction perpendicular to its rotational axis and longitudinal direction to reduce the packing volume. This direction will, hereinafter, be referred to as the flat side or direction of the reel. The width of the reel in the direction parallel to the rotational axis of the reel, and thereby perpendicularly to the longitudinal direction and flat direction of the reel, contributes to defining the capacity of the reel, that is to say the amount of line that can be wound onto the reel. This direction will be referred to as the width direction and may vary from reel to reel according to the desired capacity. Often, the width direction will be shorter than the longitudinal direction, but longer than the flat direction, whereby the reel will be formed with an oblong shape. The flat direction of the reel may be as thin as practically possible as long as it will not be too weak. Besides, the end of the reel in the longitudinal direction should not be so thin or pointed that it will cut into the line or wear it too much.

The reel may be connected to the first handle via a rotational shaft, so that the reel and the first handle are rotatable relative to each other. Thereby the first handle may be kept at rest while the reel is rotating when the line is being collected or let out. The rotational shaft may be parallel to the width direction of the reel, whereby the line is wound onto the sides of the reel in the longitudinal direction and the flat direction. The rotational shaft may typically be placed in the middle of the longitudinal direction of the reel, parallel to the width direction. The rotational shaft may be mounted on a part of the first handle so that the reel will rotate around the shaft, or it may be mounted on the reel so that the first handle will rotate around the shaft. Other mechanisms than a shaft can also be used to make the reel and the first handle rotatable relative to each other.

The line-guiding part may be fixed relative to the first handle, which contributes to correct guiding of the line on the reel when this is rotating and the line is being wound up. This enables quick and efficient winding-up of the line with little risk of error, for example the line being carried around the shaft instead of the reel. The line-guiding part may include a line-guiding slot, through which the line is guided. The line-guiding slot may be positioned radially outside the reel relative to the rotational axis thereof so that the line is guided onto the surfaces of the reel in the longitudinal direction and the flat direction thereof when the reel is being rotated. The line-guiding slot may, for example, be oriented radially towards the rotational axis of the reel and have an extent in the direction parallel to the width direction of the reel that corresponds to or is slightly smaller than the width of the reel in this direction. The line-guiding part may be connected to the first handle, for example via a rod or the like, or the first handle may include the line-guiding part. As the line-guiding part may be radially outside the reel relative to the rotational axis thereof, whereas the first handle may, for example, be outside the width direction of the reel, the connection between the line-guiding part and the first handle may include an arcuate portion, for example an arcuate rod.

The reel may include a rotatable second handle placed on the side of the reel in the width direction parallel to the rotational axis, on the opposite side to that of the first handle, wherein the rotational axis of the rotatable second handle may be parallel to but offset from the rotational axis of the reel in the longitudinal direction of the reel. The rotatable second handle may rotate around a rotational shaft, for example. The reel may thereby be rotated around its rotational axis by a cranking motion being made with this rotatable second handle, whereby the line will be let out or wound up without an operator having to let go of the handles during use. The rotatable second handle can thereby contribute to quickly and efficiently winding the line onto the reel after use.

The various parts of the line-handling device may be so arranged that the whole line-handling device is substantially flat when the line-handling device is not in use. The flat shape is very favourable when the line-handling device is to be packed up and transported. Thereby the line-handling device can easily be brought along, for example in a sack, whereby a line can be put up in places that are impassable to large means of transport.

The line may be provided with a device on at least one of its ends to help to anchor the end of the line to an anchoring point. This device may, for example, be a snap hook, which may be secured to an anchoring point. Alternatively, the line may be passed around the anchoring point, for example a tree, after which the snap hook may be secured to the line. Thereby the anchoring may be tautened, when the line is being pulled, and stay taut during use.

The locking mechanism may block rotation of the reel relative to the first handle and ensure that it remains locked. This may, for example, be achieved by means of one single locking mechanism or a two-part locking mechanism, wherein the locking mechanism may comprise a first locking device which blocks rotation of the reel relative to the first handle and a second locking device which prevents the first locking device from disengaging. Locking may, for example, be realized by the reel being displaceable relative to the first handle along the rotational axis, and by the displacement of the reel locking it in a non-rotatable position relative to the first handle. The first locking device, for preventing rotation of the reel, may, for example, be a locking groove in the side of the reel facing the first handle and a corresponding part on the first handle arranged to engage with the groove, or vice versa. The corresponding part on the first handle may also be a rod between the first handle and the line-guiding part. If the reel and the first handle are pushed towards each other as the locking groove and the corresponding part on the first handle are directly above each other, the reel will only be blocked against rotation. The line-handling device may include a mechanism pushing the reel and the first handle away from each other, for example a spring. To hold the reel and the first handle together, the locking mechanism may, as mentioned above, include a second locking device. The second locking device may, for example, comprise a snap lock with a dowel on the end of the reel, in the longitudinal direction thereof, and a corresponding second locking groove on the line-guiding part. The line-guiding part or the connection between the line-guiding part and the first handle, for example a rod, may be elastically yielding. The dowel and the corresponding second locking groove may be so arranged that they mutually engage when the reel and the first handle have been moved towards each other and oriented in such a way that the first locking device is locked. The second locking device may thereby be unlocked by the line-guiding part being moved away from the reel, whereby the second locking groove is lifted out of engagement with the dowel so that the reel and the first handle are moved away from each other. With that, the line-handling device is in the open state.

In a second embodiment, the locking mechanism may comprise a bail hinged to the first handle that can be slipped over part of the reel, whereby the bail may prevent the reel from rotating. Of course, the bail may also be placed on the reel and slipped over the first handle in order to be locked. This locking mechanism needs only this one locking device to lock the line-handling device. With this locking mechanism, the reel does not need to be displaceable relative to the first handle. When the line is being tautened, the bail will become tensioned, which may prevent it from coming loose from the reel. If the reel is displaceable relative to the first handle, the bail may become tensioned also when the line is not taut. Alternatively, the locking mechanism may comprise a locking pin extending through a hole in the first handle or the line-guiding part into a complementary locking hole in the reel, whereby the reel is prevented from rotating. The locking pin may also be passed from the reel through a hole in the first handle or the line-guiding part.

The locking mechanism makes it possible for the line-handling device to be hung by the line after the line has been suspended, without the line-handling device needing someone or something to hold it to prevent the line from being let out. When the line-handling device includes a locking mechanism, no separate part is needed in order to lock the line, which makes the line-handling system easy to use.

The attachment element for a tautening device may be placed in various places on the line-handling device, for example on the line-handling part, the first handle or the reel. With advantage, the attachment element may be so placed that it creates the least possible tensioning of the locking mechanism when the line-handling device is in use. It is thereby ensured that the lock will hold even when there is great tension on the line, and that the lock will not become worn during use. The attachment element may be of various designs, such as a round hole, an oblong hole, a hook, or a knob.

In a second aspect, the invention relates to a line-handling system for suspending a line between two anchoring points, the line-handling system comprising a line-handling device according to the first aspect of the invention and a tautening device for tautening the line. The tautening device comprises a part which can be attached to the attachment element on the line-handling device, a part that can be anchored to an anchoring point, and a part that can be tautened and remain locked. The tautening device may, for example, comprise a tautening strap with a strap hook for anchoring, a strap lock for tautening, and a connection to the line-handling device. The connection to the line-handling device may, for example, comprise a connection strap between the strap lock and a snap hook which can be connected to the attachment element on the line-handling device. All parts of the line-handling system must be strong enough to hold a suspended line, and it must further be possible for the line to carry an extra device, for example a cable-camera system. This extra device may weigh some kilos, for example up to 2, 5, or 10 kg.

The line-handling device can also be used for suspending a line between two anchoring points without a further tautening device. Only a connecting device for connecting the attachment element on the line-handling device to the line, for example a snap hook, is required. After the end the furthest away from the line-handling device has been anchored to a first anchoring point, the line-handling device may be passed around a second anchoring point, be locked, and the attachment element on the line-handling device may be connected to the line by a snap hook, for example. The advantage of this is not having to bring along an extra tautening device. The advantage of using a tautening device is to provide a better tautening, and better flexibility in relation to the length of the line. A line-handling device will typically only be able to lock the line at particular intervals, for example per half rotation of the reel, whereas a tautening device will be able to give any length of suspension within the length of the line.

In a third aspect, the invention relates to a method for suspending a line between two anchoring points, the method comprising the steps of:
  letting out a line from a line-handling device according to the first aspect of the invention and securing an end of the line to a first anchoring point;
  securing a tautening device to a second anchoring point;
  locking the line by means of the line-handling device and connecting the tautening device to an attachment element on the line-handling device; and
  tautening the line by means of the tautening device, so that the line-handling device hangs suspended on the line in the locked state.

This method may, with advantage, be carried out by using the line-handling system according to the second aspect of the invention. This method for suspending a line between two anchoring points is simple, so that a line may quickly be suspended and taken down. Besides, it is not necessary to think of where the line-handling device is going to be placed during use, as it will hang safely on the line.

BRIEF DESCRIPTION OF THE DRAWINGS

In what follows, examples of preferred embodiments are described, which are visualized in the accompanying drawings, in which.

DETAILED DESCRIPTION OF THE DRAWINGS

In the figures, the reference numeral 30 indicates a line-handling device according to the first aspect of the invention. Like reference numerals indicate like or similar elements in the figures. The drawings are presented in a schematic and simplified form, and different elements are not necessarily to scale.

Figure 1:
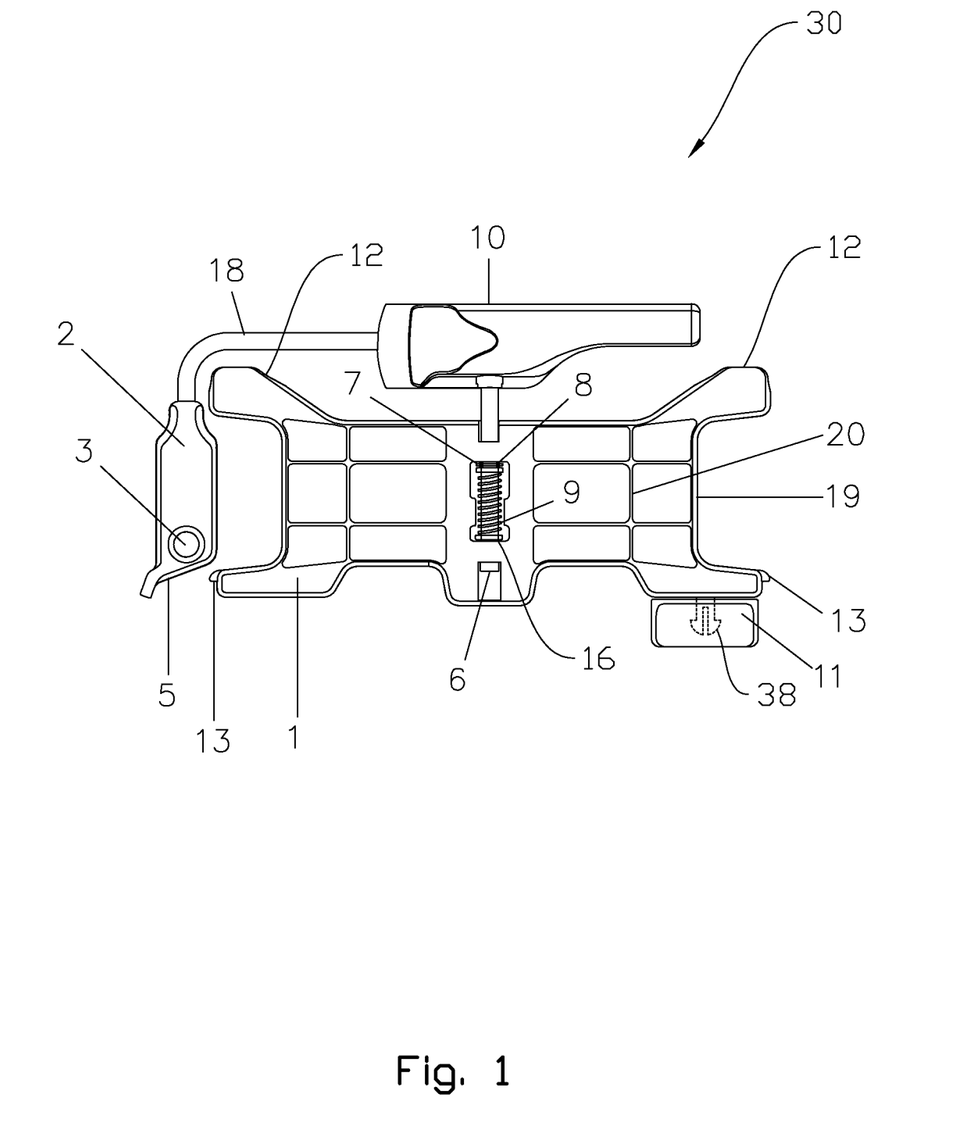
FIG. 1 shows an embodiment of the line-handling device (without a line) in the open, rotatable position.
Figure 2:
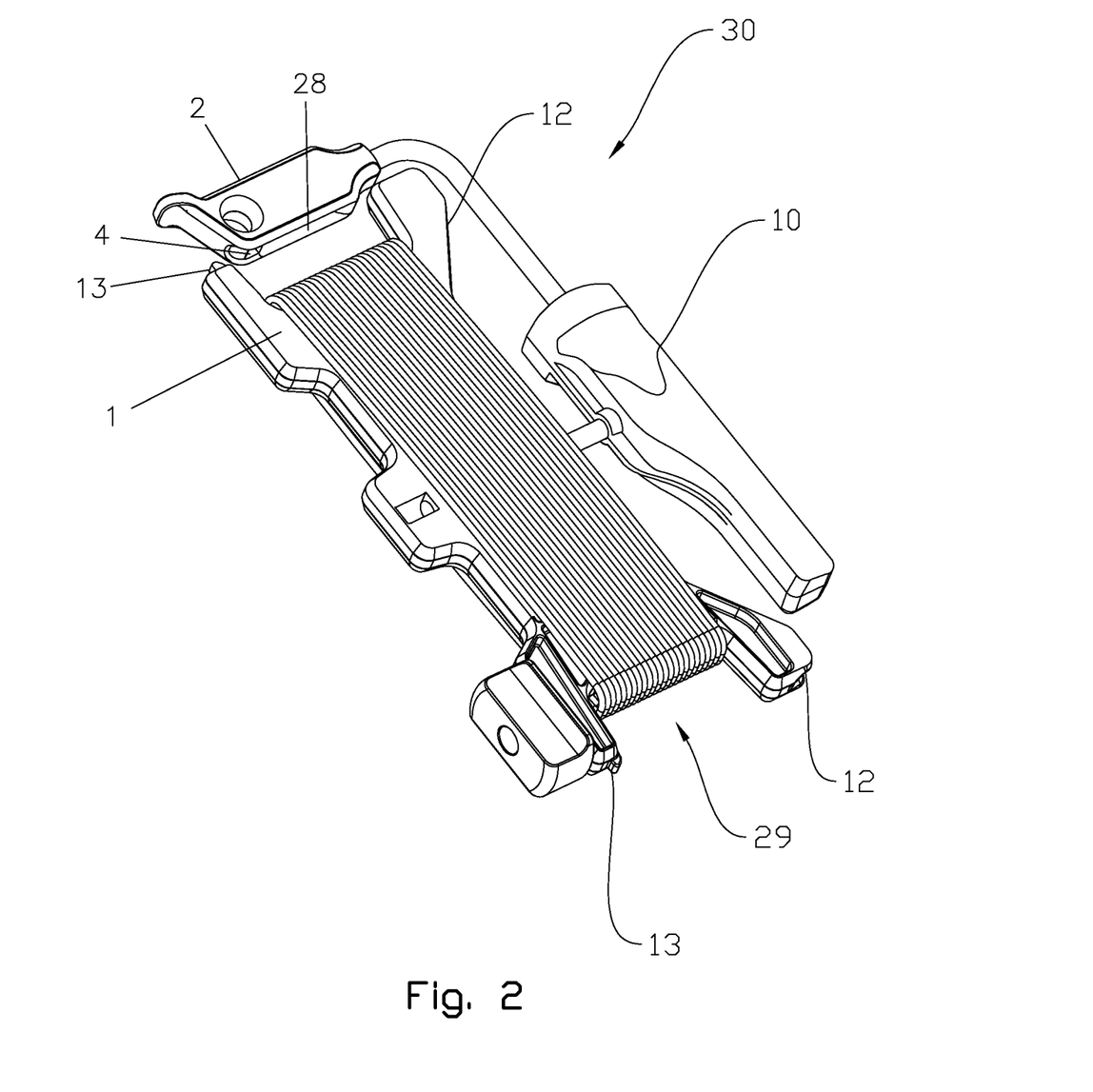
FIG. 2 shows the line-handling device of FIG. 1 (with a line) viewed in perspective.

FIGS. 1-2 show a line-handling device 30 in an open, rotatable position. FIG. 1 is without a line and FIG. 2 is with a line 29. The line-handling device 30 comprises a flat reel 1 which is rotatable relative to a first handle 10 by means of a rotational shaft 6. The reel 1 has an extent in one direction, perpendicular to the rotational shaft 6 (the longitudinal direction), whereas it is substantially flat in the direction perpendicular to the rotational shaft 6 and the longitudinal direction (the flat direction). Thereby the reel 1 has a small packing volume but still a large contact surface 19 for winding up the line 29 (see FIG. 2). The reel 1 includes ribs 20 for bracing the reel 1. In the embodiment shown, the shaft 6 is connected to the first handle 10, and the reel 1 is rotatable around the shaft 6. The shaft 6 is surrounded by a helical spring 9 which has been pre-tensioned into pushing the first handle 10 away from the reel 1, whereby the line-handling device 30 is in the open, rotatable position as will be explained in what follows. A locking disc 7 with an associated locking groove 8 on the shaft 6 provides for the helical spring 9 to be compressed against the contact surface 16 on the reel 1 when the first handle 10 and the reel 1 are pushed towards each other. The reel 1 additionally comprises a rotatable second handle 11 positioned on the opposite side of the reel 1 relative to the first handle 10. The rotatable, second handle 11 is rotatable around a shaft 38 (shown in a broken line as it is hidden by the rotatable second handle 11 in use) which is parallel to, but offset from, the rotational shaft 6 of the reel 1, whereby a cranking motion of the rotatable second handle 11 relative to the first handle 10 will make the reel 1 rotate around the shaft 6. Besides, the first handle is connected to a line-guiding part 2 via an arcuate rod 18, so that the line-guiding part 2 is radially outside the reel 1 relative to the rotational shaft 6. Thereby the line-guiding part 2 will guide the line 29 correctly onto the reel 1. The line-guiding part 2 includes a slot 28 for the line 29, an attachment element 3 for the attachment of a strap, and a locking groove 4 in the face facing the reel 1. The locking groove 4 corresponds with a dowel 13 on the end of the longitudinal direction of the reel 1. The locking mechanism is thereby realized by the reel 1 being moved parallel to the shaft 6 towards the first handle 10, or vice versa. The reel 1 is formed with a locking groove 12 (seen best in FIG. 6) corresponding with the rod 18 between the first handle 10 and the line-guiding part 2. Thereby the reel 1 is locked against rotating around the shaft 6 when the rod 18 is placed above the locking groove 12, and the first handle 10 and the reel 1 are pushed towards each other. The reel 1 and the first handle 10 are prevented from returning to the open position by the dowel 13 being secured to the locking groove 4 in the line-guiding part 2.

Figure 3:
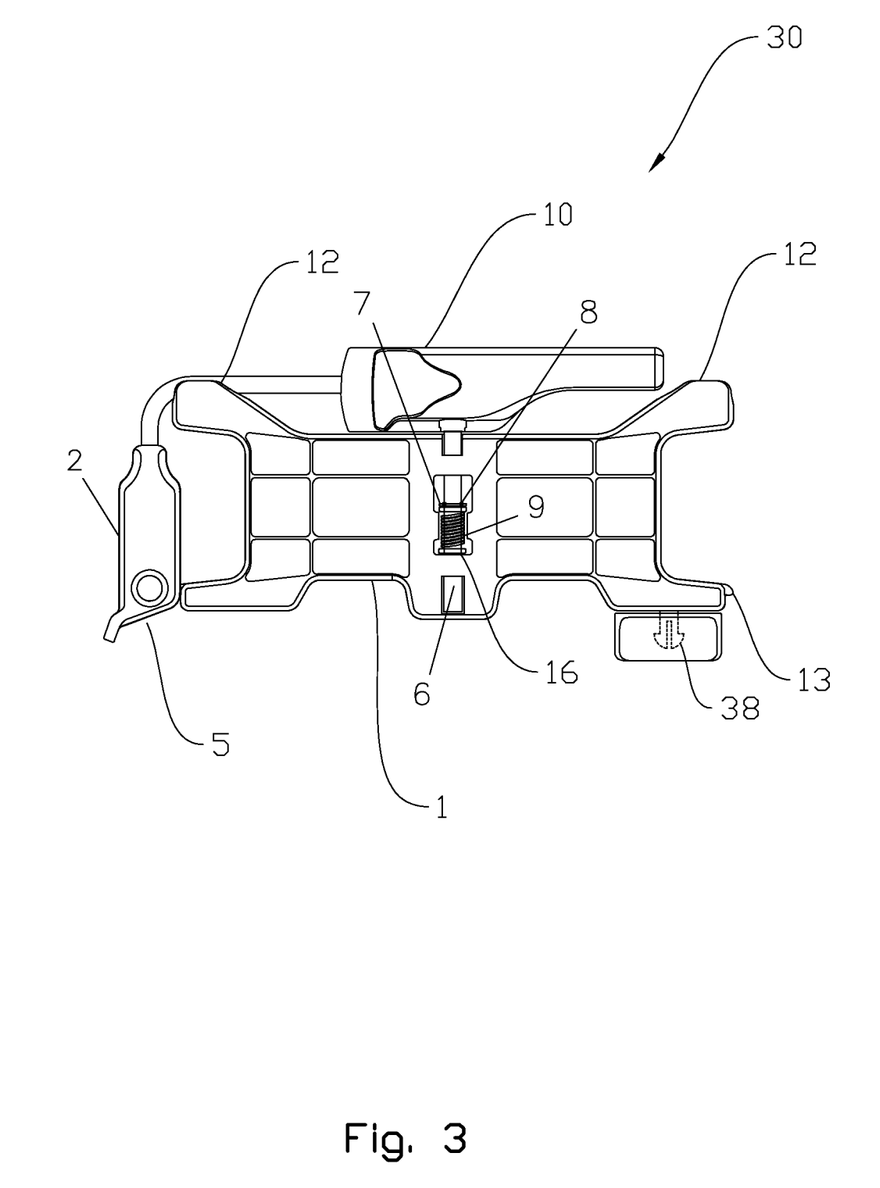
FIG. 3 shows the line-handling device of FIGS. 1-2 (without a line), viewed from the same angle as in FIG. 1, in the locked position.
Figure 4:
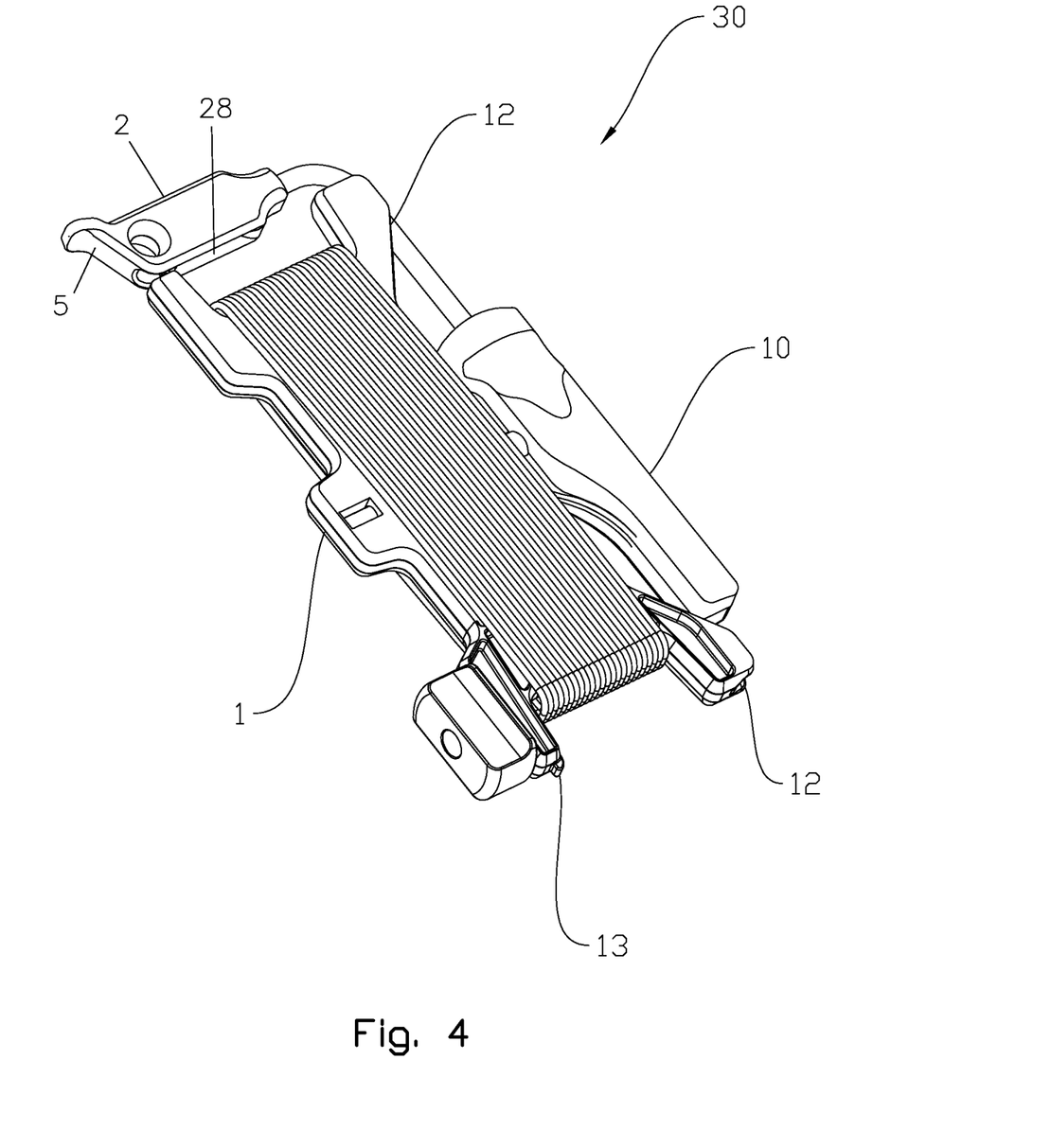
FIG. 4 shows the line-handling device from FIGS. 1-3 (with a line), viewed in perspective from the same angle as in FIG. 2, in the locked position.

FIGS. 3-4 show the line-handling device 30 of FIGS. 1-2 in the locked position. In the figures, the helical spring 9 is compressed between the contact surface 16 on the reel 1 and the locking disc 7 that is fixed to the shaft 6. The helical spring 9 would therefore push the reel 1 and the first handle 10 away from each other so that the line-handling device 30 would be in the open state, if the dowel 13 (not visible in the locked state) and the corresponding locking groove 4 (not visible in the locked state) on the line-guiding part 2 were not connected to each other. The line-handling device 30 can easily be changed from the locked state into the open state by the line-guiding part 2 being pushed away from the reel 1 by means of the contact surface 5 on the line-guiding part 2. The rod 18 is elastically yielding whereby a snap lock is achieved. The reel 1 includes a locking groove 12 and a dowel 13 on two sides of the reel 1 opposite to each other, whereby the line-handling device 30 has a lockable position at every half turn of the reel 1.

Figure 5:
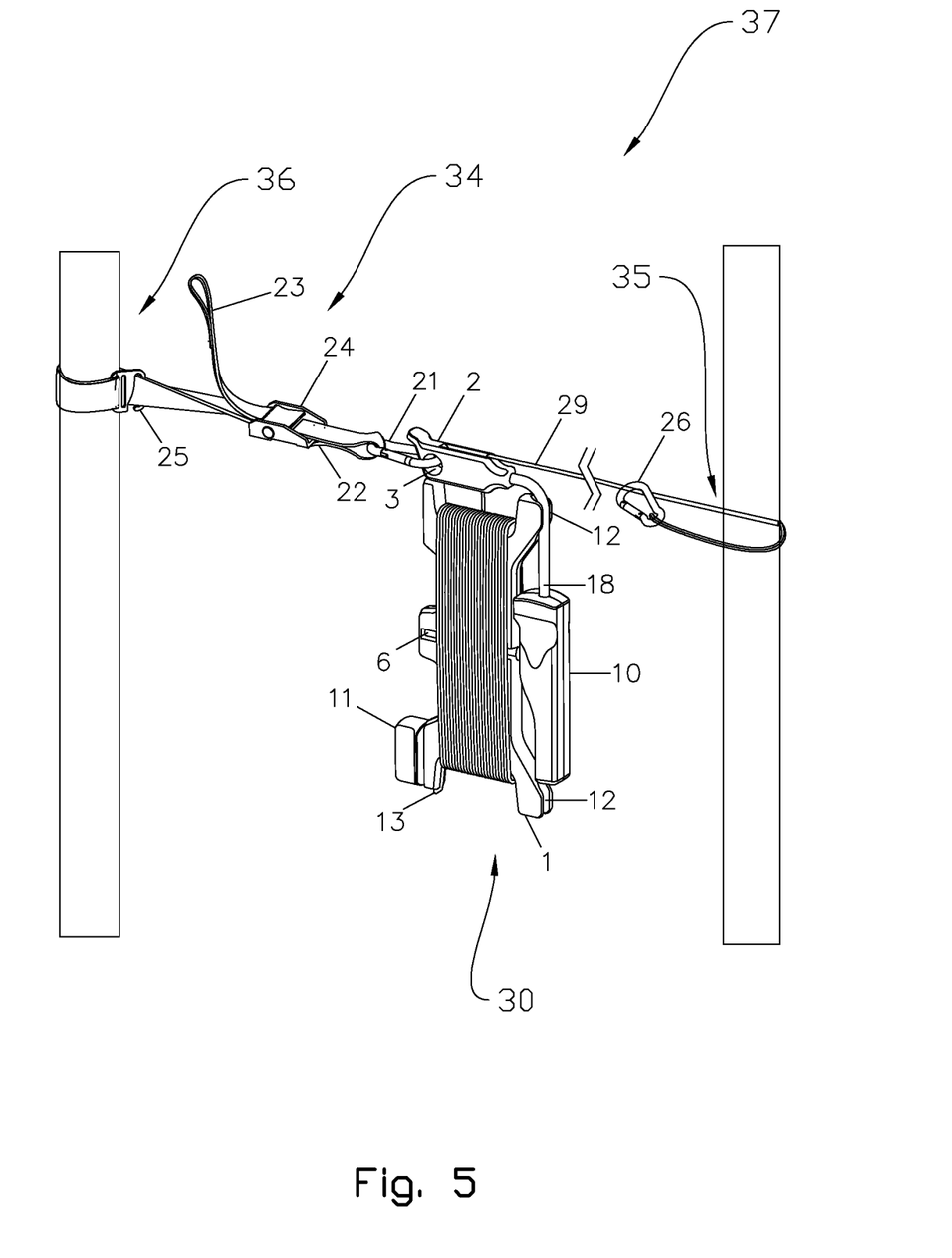
FIG. 5 shows a line-handling system with the line-handling device of FIGS. 1-4 (with a line) in the locked position in the suspended state.

FIG. 5 shows a line-handling system 37 comprising the line-handling device 30 of FIGS. 1-4 and a tautening device 34. The line-handling system 37 is shown in use, wherein the line-handling device 30 is in the locked state and suspended by the line 29. The end of the line 29 is secured to a first anchoring point 35 by means of a snap hook 26 for anchoring the line 29. The line-handling device 30 is secured with a snap hook 21 from the attachment element 3 on the line-guiding part 2 to a connection strap 22. This connection strap 22 is part of the tautening device 34 and is connected to a tautening strap 23 via a strap lock 24. The tautening strap 23 is anchored to a second anchoring point 36 via a strap hook 25.

Figure 6:
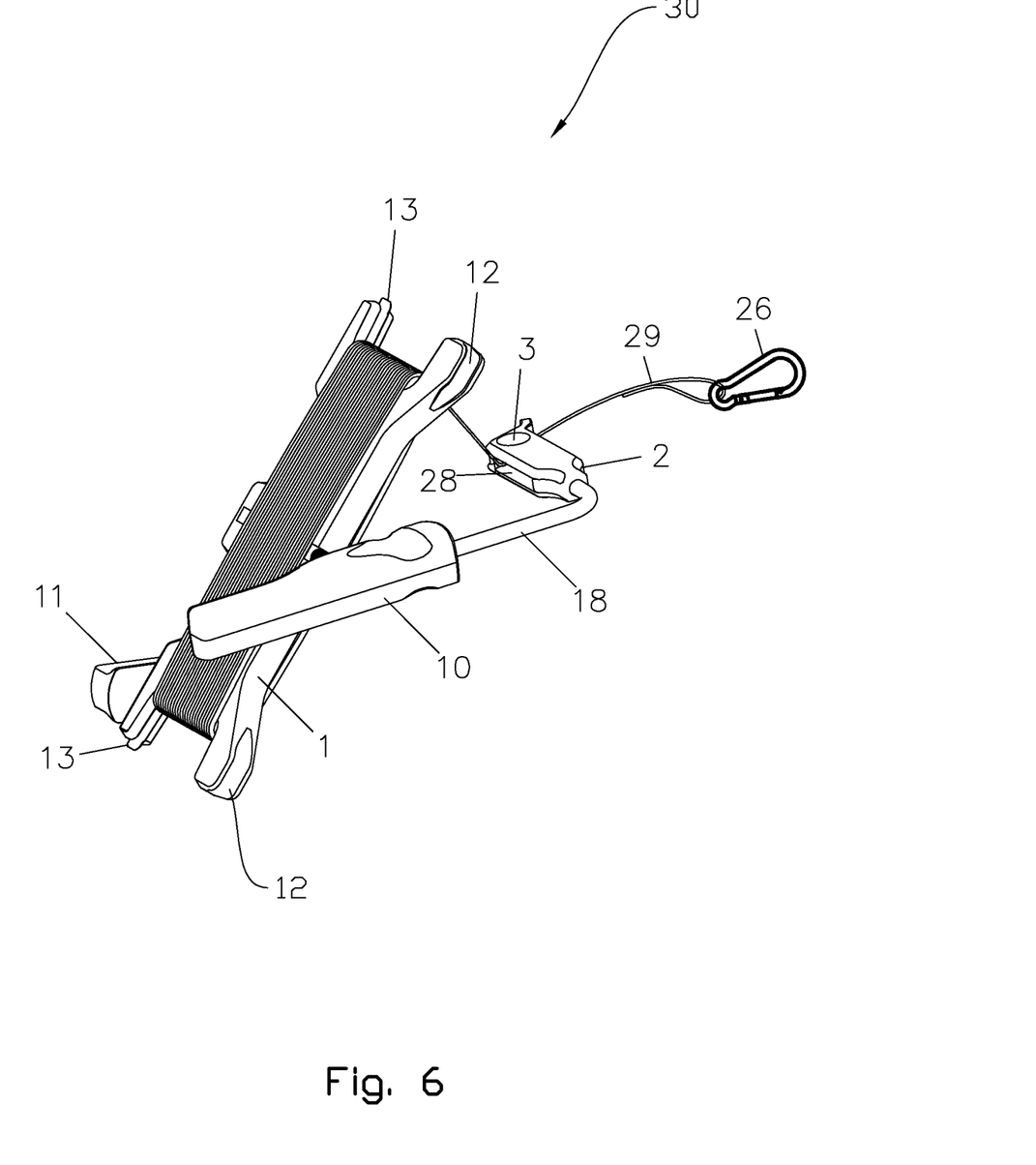
FIG. 6 shows the line-handling device of FIGS. 1-5 (with a line) during rotation of the reel.

FIG. 6 shows the line-handling device 30 of FIGS. 1-5 in the open state, in which the reel 1 has partially been rotated. Here, it is seen clearly that the line 29 is guided through the line-guiding slot 28 in the line-guiding part 2. The figure also shows how the reel 1 is rotated by means of the first handle 10 and the rotatable second handle 11, whereby the line 29 is let off or wound onto the reel 1.

The method for suspending a line 29 by means of the line-handling system 37 of FIG. 5, which includes the line-handling device 30 of FIGS. 1-4 and 6, is as follows: The line 29 is let out from the flat reel 1 by the line 29 being pulled out via the line-guiding slot 28 on the line-guiding part 2. When the line 29 is being pulled, the flat reel 1 rotates around the shaft 6. The line-handling device 30 is held firmly by the first handle 10 which does not rotate. The end of the line 29 is secured to a first anchoring point 35 by means of the snap hook 26. When the desired length of line 29 has been brought out, the reel 1 and the first handle 10 are pushed together from the open to the closed position when the rod 18 and the locking groove 12 are positioned above each other. Thereby, the flat reel 1 can no longer rotate around the shaft 6. The line 29 is tautened by the connection strap 22 being attached with the snap hook 21 to the attachment element 3 on the line-guiding part 2. The tautening strap 23 is secured around a second anchoring point 36 by means of the strap hook 25. The line 29 is tautened by pulling on the loose end of the tautening strap 23. The strap lock 24 ensures that the tautening strap 23, the connection strap 22 and the line 29 stay taut. The line 29 can be tautened without any more line 29 being unwound from the reel 1, as the reel 1 has been moved into the locked position and cannot rotate around the shaft 6. After use, the line 29 is slackened by releasing the strap lock 24 and disconnecting the snap hook 26 from the attachment element 3 on the line-guiding part 2. The reel 1 is then moved back into the open position, and the line 29 is wound onto the reel 1 again by rotating the reel 1 around the shaft 6 by means of the rotatable second handle 11. This crank solution can wind up the line 29 substantially faster than if it will have to be coiled up manually.

Figure 7:
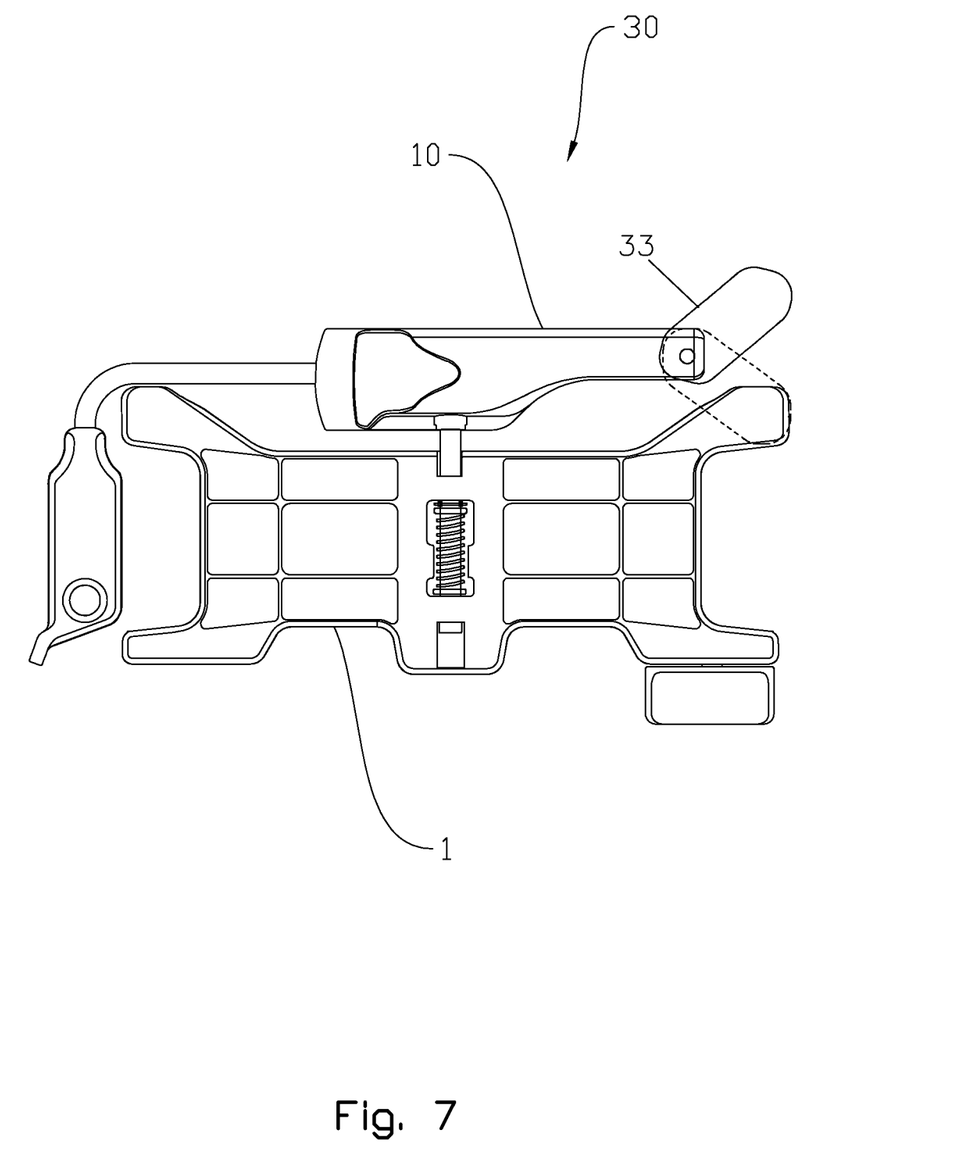
FIG. 7 shows an embodiment of the line-handling device (without a line) with a second locking mechanism.

FIG. 7 shows an alternative embodiment of the line-handling device 30, in which the locking mechanism comprises a bail 33 hinged to the first handle 10, so that it can be slipped over part of the reel 1. Thereby the reel 1 is prevented from rotating relative to the first handle 10. The broken line shows how the bail 33 can be slipped over part of the reel 1 to lock the line-handling device. This locking mechanism can function with or without the reel 1 and the first handle 10 being movable towards each other.

Figure 8:
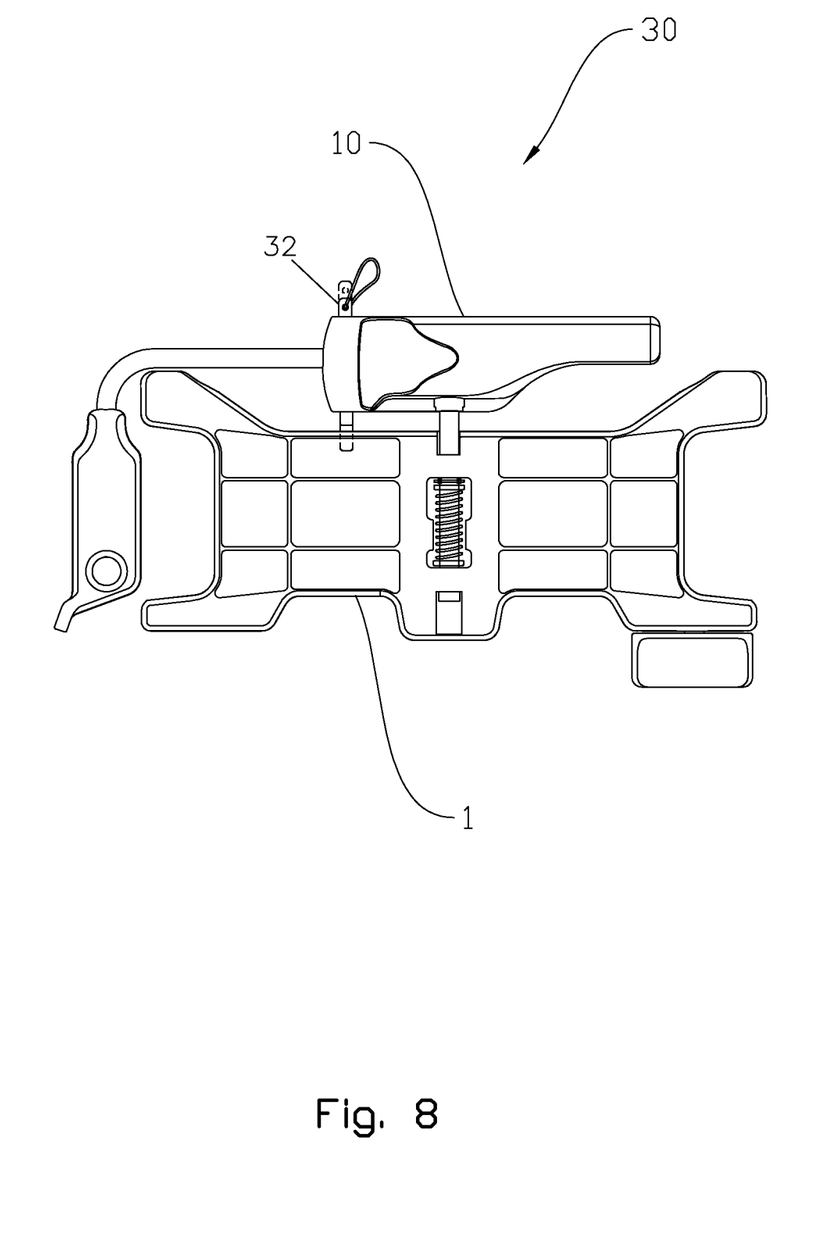
FIG. 8 shows an embodiment of the line-handling device (without a line) with a third locking mechanism.

FIG. 8 shows a further embodiment of the line-handling device 30 in the locked state, the locking mechanism comprising a locking pin 32 which has been passed linearly through a locking hole in the first handle 10 and into a locking hole in the reel 1, whereby the reel 1 is prevented from rotating relative to the first handle 10. The locking pin 32 and the corresponding locking hole in the reel 1 may possibly have threads so that the line-handling device 30 may be further locked by the locking pin 32 being able to be screwed to the reel 1.

Figure 9:
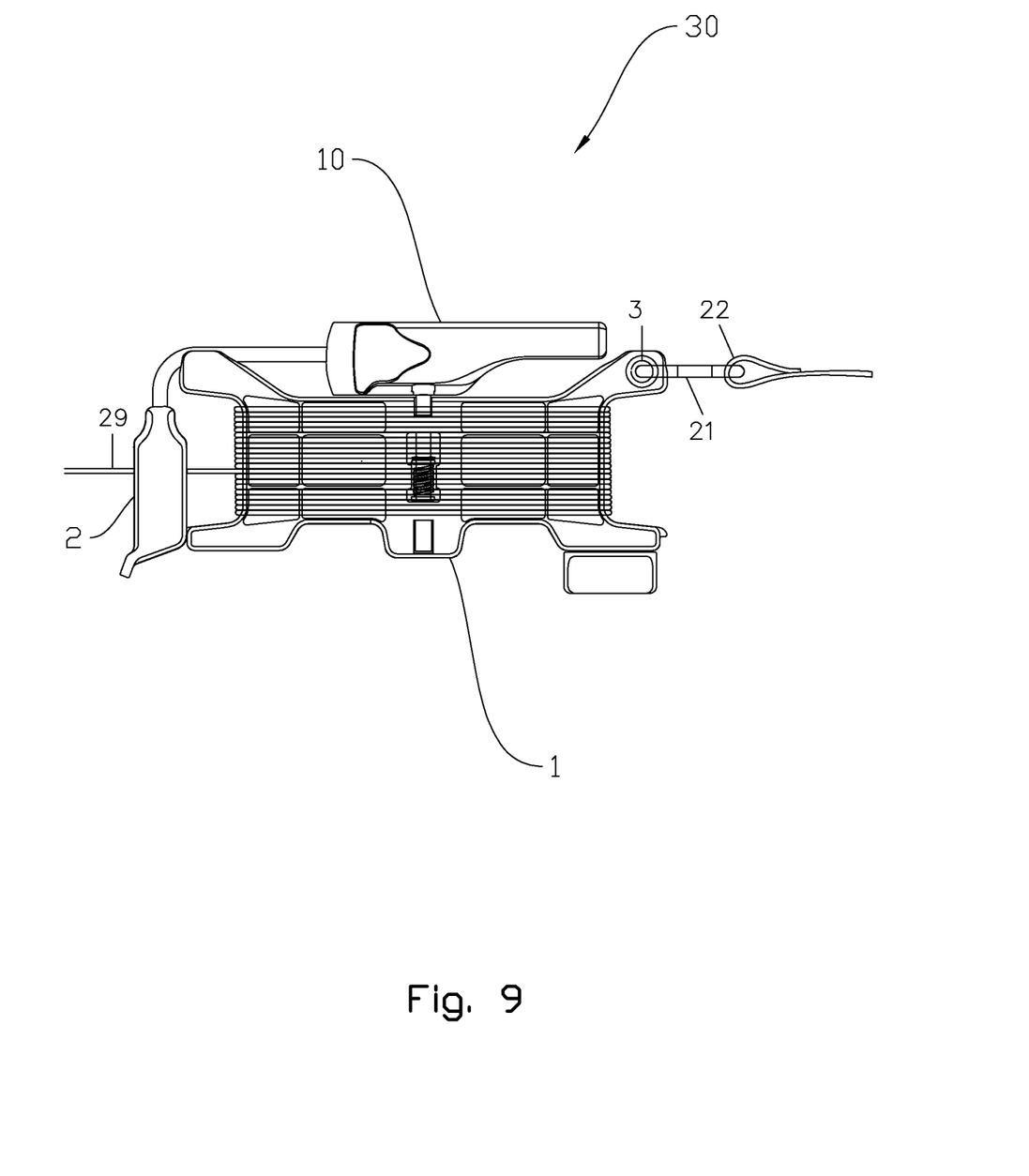
FIG. 9 shows an embodiment of the line-handling device (with a line) in which the attachment element is placed on the reel.
Figure 10:
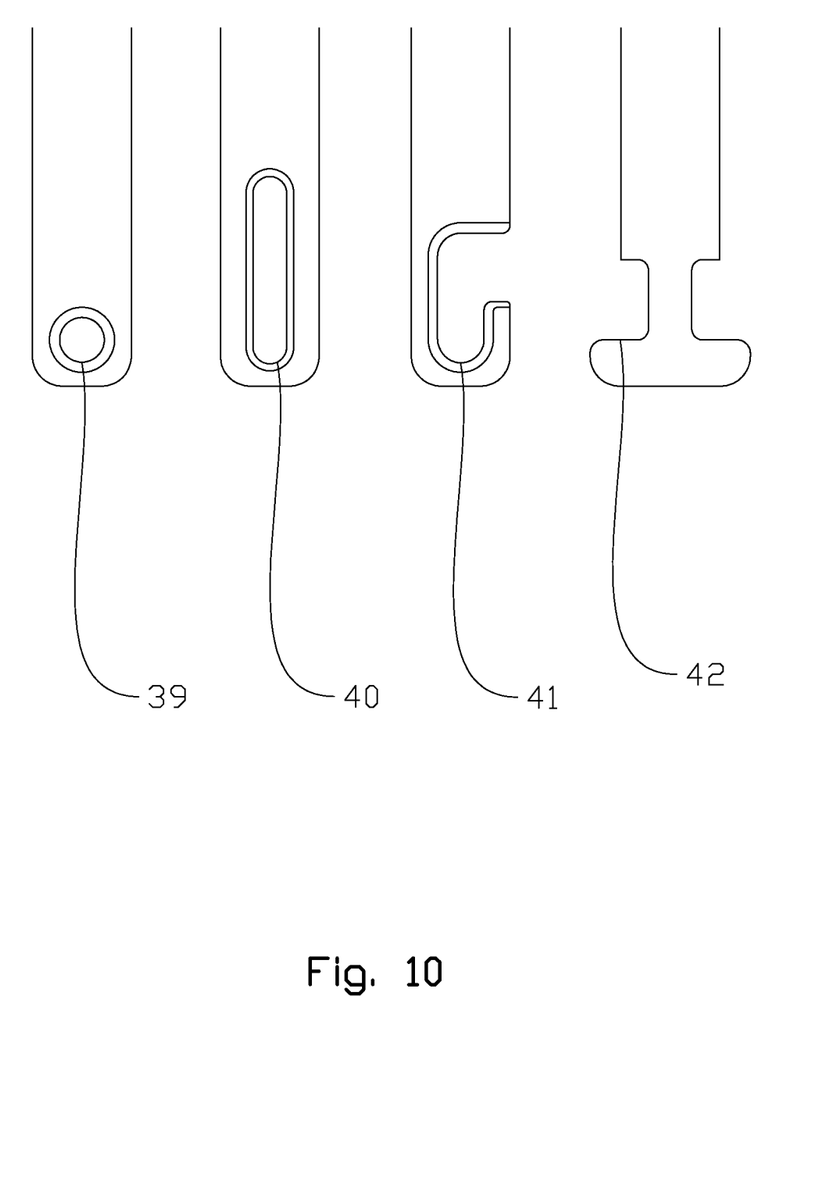
FIG. 10 shows different embodiments of the attachment element.

FIG. 9 shows a further embodiment of the line-handling device 30, in which the attachment element 3 for the tautening device 34 is placed on a part of the reel 1 instead of on the line-guiding part 2. The figure shows the line-handling device 30 in the suspended state, in which the attachment element 3 is connected to a connection strap 22 via a snap hook 21. FIG. 10 shows different embodiments of the attachment element, for example a round hole 39, an oblong hole 40, a hook 41 and a knob 42.

Figure 11:
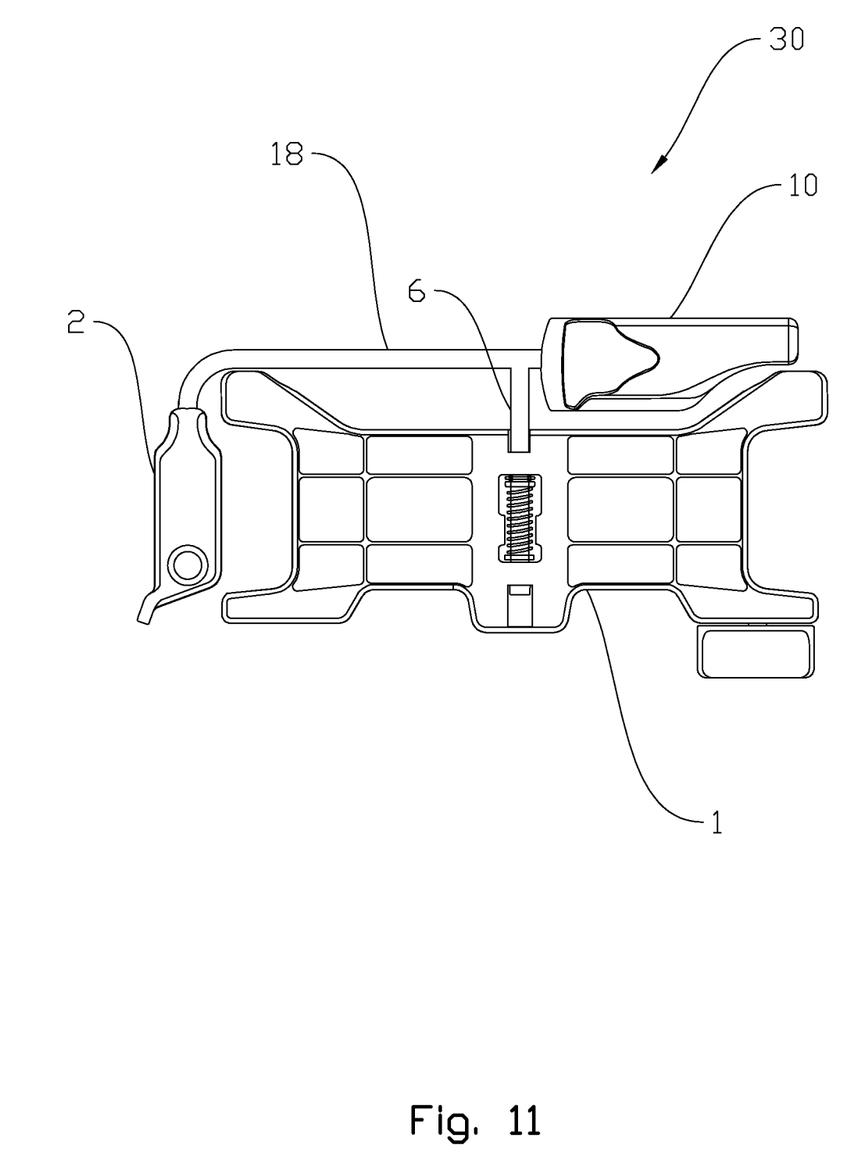
FIG. 11 shows an embodiment of the line-handling device (without a line) with a second connection between the line-guiding part, the first handle, and a rotational shaft.

FIG. 11 shows an embodiment of the line-handling device 30, in which the reel 1 is rotatable around a shaft 6 connected to the rod 18 between the line-guiding part 2 and the first handle 10. Thus, the shaft 6 does not have to be directly connected to the first handle 10.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A line-handling device for letting out, winding up and locking a line, the line-handling device comprising:
   a first handle;
   a substantially flat reel which is rotatable relative to the first handle;
   a line-guiding part which is fixed relative to the first handle;
   a locking mechanism for locking the reel in a non-rotatable position; and
   an attachment element for a tautening device,
   wherein the reel is displaceable relative to the first handle parallel to the rotational axis of the reel.

2. The line-handling device according to claim 1, wherein the reel is connected to the first handle via a shaft.

3. The line-handling device according to claim 1, configured such that the line-handling device is substantially flat when not in use.

4. The line-handling device according to claim 1, wherein the reel includes a rotatable second handle placed on the opposite side of the reel relative to the handle, and wherein the rotational axis of the second rotatable handle is parallel to, but offset from, the rotational axis of the reel.

5. The line-handling device according to claim 1, wherein the attachment element for the tautening device is placed on the line-guiding part.

6. The line-handling device according to claim 1, wherein the reel has a rounded surface in its longitudinal direction to avoid wear on the line.

7. The line-handling device according to claim 1, wherein a slot for the line in the line-guiding part is oriented radially towards the rotational axis of the reel and has an extent in the direction parallel to the width direction of the reel that is smaller than the width of the reel in this direction.

8. The line-handling device according to claim 1, wherein the attachment element is formed as a hole in the line-guiding part.

9. The line-handling system for suspending a line between two anchoring points, wherein the line-handling system comprises a line-handling device comprising a first handle, a substantially flat reel which is rotatable relative to the first handle, a line-guiding part which is fixed relative to the first handle, a locking mechanism for locking the reel in a non-rotatable position, and an attachment element for a tautening device, wherein the reel is displaceable relative to the first handle parallel to the rotational axis of the reel, and wherein the line-handling system further comprises the tautening device for tautening the line.

10. A method for suspending a line between two anchoring points, wherein the method comprises the steps of:
   letting out a line from a line-handling device comprising a first handle, a substantially flat reel which is rotatable relative to the first handle, a line-guiding part which is fixed relative to the first handle, a locking mechanism for locking the reel in a non-rotatable position, and an attachment element for a tautening device, wherein the reel is displaceable relative to the first handle parallel to the rotational axis of the reel;
   securing an end of the line to a first anchoring point;
   securing a tautening device to a second anchoring point;
   locking the line via the line-handling device and connecting the tautening device to the attachment element on the line-handling device; and
   tautening the line via the tautening device so that the line-handling device hangs suspended on the line in a locked state.

* * * * *